US012511700B2

(12) United States Patent
Hoff et al.

(10) Patent No.: US 12,511,700 B2
(45) Date of Patent: Dec. 30, 2025

(54) METHOD AND SYSTEM FOR PESTICIDE MANAGEMENT OF AN ARABLE FIELD

(71) Applicant: Bayer Aktiengesellschaft, Leverkusen (DE)

(72) Inventors: Simon Franz Hoff, Pulheim (DE); Philipp Senger, Bergisch Gladbach (DE)

(73) Assignee: BAYER AKTIENGESELLSCHAFT (DE)

( * ) Notice: Subject to any disclaimer, the term of this patent is extended or adjusted under 35 U.S.C. 154(b) by 467 days.

(21) Appl. No.: 17/768,437

(22) PCT Filed: Oct. 12, 2020

(86) PCT No.: PCT/EP2020/078535
§ 371 (c)(1),
(2) Date: Apr. 12, 2022

(87) PCT Pub. No.: WO2021/074048
PCT Pub. Date: Apr. 22, 2021

(65) Prior Publication Data
US 2024/0114882 A1    Apr. 11, 2024

(30) Foreign Application Priority Data

Oct. 16, 2019  (EP) ..................................... 19203631
Dec. 12, 2019  (EP) ..................................... 19215600

(51) Int. Cl.
*G06Q 50/02*    (2024.01)
(52) U.S. Cl.
CPC .................... *G06Q 50/02* (2013.01)

(58) Field of Classification Search
CPC ........ G06Q 50/02; A01M 7/00; A01M 7/0089
USPC ......................................................... 705/500
See application file for complete search history.

(56) References Cited

U.S. PATENT DOCUMENTS

| 9,981,001 | B2 | 5/2018 | Del Vecchio |
| 2018/0168130 | A1 | 6/2018 | Wu et al. |
| 2018/0288976 | A1* | 10/2018 | Temby .................. A01K 47/06 |
| 2018/0288977 | A1 | 10/2018 | Hummer et al. |
| 2019/0373862 | A1* | 12/2019 | Hummer ............ G01N 33/0063 |

FOREIGN PATENT DOCUMENTS

| AU | 2005232273 A1 | 5/2006 |
| CA | 2886680 A1 | 4/2014 |
| CA | 3060517 A1 | 11/2018 |

(Continued)

OTHER PUBLICATIONS

CSIRO "Bee sensors take flight to help farmers", Phys Org, Jan. 15, 2014 https://phys.org/news/2014-01-bee-sensors-flight-farmers.html (Year: 2014).*

(Continued)

*Primary Examiner* — Lynda Jasmin
*Assistant Examiner* — Rebecca R Novak
(74) *Attorney, Agent, or Firm* — MORRISON & FOERSTER LLP

(57) ABSTRACT

The invention relates to a method and a system for pesticide management of an arable field, in particular taking into account health-related data of pollinators. The invention also relates to a computer program product and to a storage medium.

15 Claims, 7 Drawing Sheets

(56) References Cited

FOREIGN PATENT DOCUMENTS

| CN | 102017937 A | 4/2011 | | |
|---|---|---|---|---|
| CN | 105389737 A | 3/2016 | | |
| CN | 105784932 A | 7/2016 | | |
| CN | 109688792 A | 4/2019 | | |
| WO | WO-2018165051 A1 | * | 9/2018 | ............ A01K 47/06 |
| WO | WO-2018184014 A1 | * | 10/2018 | ............ A01K 47/00 |
| WO | WO-2018216214 A1 | * | 11/2018 | ............ A01M 7/00 |
| WO | 2019081375 A1 | 5/2019 | | |
| WO | 2019094266 A1 | 5/2019 | | |

OTHER PUBLICATIONS

Anonymous, (2009). "Regulations" Official Journal of the European Union. 1107/2009: 50 pages.

Anonymous, (2014). "Die Bedeutung der Bestauber fur die Landwirtschaft" located at https://www.iva.de, last visited on Aug. 25, 2022, 48 pages.

Bromenshenk, J.J. et al. (2015). "Bees as Biosensors: Chemosensory Ability, Honey Bee Monitoring Systems, and Emergent Sensor Technologies Derived from the Pollinator Syndrome," Biosensors, 5:678-711.

Chazette, L. et al. (2016). "Basic Algorithms for Bee Hive Monitoring and Laser-based Mite Control," IEEE Symposium Series on Computational Intelligence; Conference Paper, 8 pages.

Edwards-Murphy, F. et al. (2016). "b+WSN: Smart beehive with preliminary decision tree analysis for agriculture and honey bee health monitoring," Computers and Electronics in Agriculture, 124:211-219.

Tautz, J. et al. (2003). "Behavioral performance in adult honey bees is influenced by the temperature experienced during their pupal development," PNAS, 100(12):7343-7347.

Tiwari, A. (2018). "A Deep Learning Approach to Recognizing Bees in Video Analysis of Bee Traffic," All Graduate theses and Dissertations 7076, located at https://digitalcommons.usu.edu/etd/7076 last visited on Aug. 25, 2022, 2018, 48 pages.

Bee sensors take flight to help farmers (Jan. 15, 2014) retrieved Oct. 30, 2025 from https://phys.org/news/2014-01-bee-sensors-flight-farmers.html.

* cited by examiner

```
                                                                    ← 100
110
┌─────────────────────────────────────────────────────────────────────┐
│ Collecting health-related data of pollinators in the vicinity of an │
│ agricultural field and/or on an agricultural field by means of at   │
│ least one pollinator sensor                                         │
└─────────────────────────────────────────────────────────────────────┘
              │
120           │
┌─────────────────────────────────────────────────────────────────────┐
│ Forwarding the collected health-related data to the computing unit  │
│ via the receiving unit                                              │
└─────────────────────────────────────────────────────────────────────┘
              │
130           │
┌─────────────────────────────────────────────────────────────────────┐
│ Comparing the health-related data of the pollinators with reference │
│ data by means of the computing unit and thereby ascertaining        │
│ whether or not a plant protection product can be applied to the     │
│ agricultural field                                                  │
└─────────────────────────────────────────────────────────────────────┘
              │
140           │
┌─────────────────────────────────────────────────────────────────────┐
│ Displaying and/or outputting an item of information by the output   │
│ unit relating to the information ascertained by the computing unit  │
│ as to whether or not a plant protection product can be applied to   │
│ the agricultural field and/or storing said item of information in a │
│ data storage medium                                                 │
└─────────────────────────────────────────────────────────────────────┘
              │
150           │
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Activating a plant protection product control unit when the         │
│ computing unit has ascertained that a plant protection product can  │
│ be applied to the agricultural field                                │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 2

METHOD AND SYSTEM FOR PESTICIDE MANAGEMENT OF AN ARABLE FIELD

CROSS-REFERENCE TO RELATED APPLICATIONS

This application is a national stage application under 35 U.S.C. § 371 of International Application No. PCT/EP2020/078535, filed internationally on Oct. 12, 2020, which claims benefit of European Application Nos.: 19203631.7, filed on Oct. 16, 2019, and 19215600.8, filed on Dec. 12, 2019.

FIELD OF THE INVENTION

The present invention relates to a method and a system for plant protection product management on an agricultural field, taking especially into account health-related data of pollinators. The present invention also encompasses a computer program product and a storage medium.

BACKGROUND OF THE INVENTION

Digital agricultural products that are available today assist the farmer in optimizing the use of plant protection products and in reducing said use altogether. For example, the risk of certain cultivated useful plants being affected by certain diseases can be calculated by analysis of various data such as, for example, the local weather, biomass, and the like by means of a digital agriculture product, and appropriate instructions can be derived. With respect to the risk of pest infestation or weed pressure or infestation on an agricultural field, valuable information can also be provided by digital agricultural products.

Bees and other pollinators are of central importance to agriculture and to food production. As a result of pollination, plants become fertilized, are able to reproduce, and are able to bear fruit, seeds, and leaves, which in turn form a basis for food production. However, the health of pollinators is threatened by a complex interplay of various factors such as parasites, climate change, habitat loss, food availability, pollution, invasive alien species, diseases, and plant protection products.

Plant protection products contain biologically active compounds which serve to protect the plant. Insecticides are intended to prevent the spread of insect pests, herbicides are intended to destroy weeds, and fungicides are intended to control fungal diseases in plants. In order for plant protection products to perform their function, they must be biologically active against the pests which they are to control. However, since non-target organisms may also come into contact with the products, a comprehensive set of rules has been established in order to be able to assess the safety of plant protection products for non-target organisms. The rules ensure that plant protection products do not have any unacceptable effects on non-target organisms, i.e., on honeybees, earthworms, fish, algae or birds for example, when they are used as directed.

Possible routes of exposure by which pollinators can come into contact with plant protection products are: spray residues on flowers after application of plant protection products to foliage, spray residues on flowers near treated fields owing to use/drift of spray mist as a result of wind; residues in pollen and/or nectar of cultivated plants treated prior to flowering with systemically acting products which may have penetrated into the flowers; residues in pollen and/or nectar of cultivated plants already treated as seeds with systemically acting plant protection products; dust drift onto flowers near treated fields as a result of the sowing of improperly treated seeds or the use of unsuitable seed drills; residues in honeydew, a secretion of aphids which has a high sugar content and which serves as a food source for bees; exposure due to the physiology of the cultivated plants/wild plants and to the weather conditions, such as, for example, residues in guttation liquids.

Before a product is authorized, relevant studies and risk assessments satisfying the scientific criteria of environmental toxicology must be carried out. For example, Regulation (EC) No 1107/2009 of the European Parliament and of the Council of 21 Oct. 2009 stipulates that a plant protection product is only authorized if it "has no unacceptable acute or chronic effects on colony survival and development, taking into account effects on honeybee larvae and honeybee behavior."

All risks associated with specific exposure scenarios are quantified in the risk assessment process. Where the risk exceeds a critical level, the implementation of risk mitigation measures is required. The risk mitigation measures to be taken are described on the label of each product and are obligatory for every plant protection product user.

Examples of standard risk mitigation measures for products toxic to bees and applied by spraying include:
- limiting application to evening hours when honeybees are no longer flying,
- precise planning of treatment times to avoid applying plant protection products precisely when flowering plants are in full bloom,
- limiting the frequency of application of plant protection products,
- using drift-reducing techniques in order to avoid the deposition of plant protection product residues on nearby areas containing flowering plants, and
- removing flowering weeds from cultivated areas prior to application (see the brochure "Die Bedeutung der Bestäuber für die Landwirtschaft" [The importance of pollinators to agriculture]; https://www.iva.de).

SUMMARY OF THE INVENTION

In view of the above, the present invention aims to further improve existing digital agricultural products. In particular, the present invention aims to improve existing digital agricultural products in order to preserve pollinator health using a holistic ecological and economic approach.

In some embodiments, the present disclosure provides a system for plant protection product management on an agricultural field comprising:
- at least one pollinator sensor configured to collect health-related data of pollinators in the vicinity of an agricultural field and/or on an agricultural field,
- a receiving unit
- a computing unit; and
- an output unit.

In some embodiments, the at least one pollinator sensor is configured to make the health-related data of the pollinators available to the computing unit via the receiving unit. The computing unit is configured to compare the health-related data of the pollinators with reference data and thereby ascertain whether or not a plant protection product can be applied (with respect to pollinator health) to the agricultural field. The output unit is configured to display, output, or store in a data storage medium at least the information from the computing unit relating to the ascertainment of whether or not a plant protection product can be applied to the agricultural field.

In other words, the system collects health-related data relating to pollinators in the vicinity of an agricultural field and/or on an agricultural field and includes said data—in addition to any risk mitigation measures that may be in place and other data if there are any—in the decision-making process for plant protection product management. This means that if it is established that the health of the pollinators is impaired, for example due to disease-related stress and/or other causes, this is recorded as a result of collection of the health-related data and included in the decision-making process as to whether or not a plant protection product can be applied to the agricultural field. This means that the health of the pollinators is taken into account in the decision-making process to a greater degree than is required by any risk mitigation measures that may be in place. The health-related data of the pollinators can, for example, be collected via one (or more) camera(s) installed on the agricultural field.

In some embodiments, the computing unit of the system is configured such that the comparison of the collected health-related data of the pollinators with the reference data can be used to establish the state of health of the pollinators and thereby ascertain whether or not a plant protection product can be applied to the agricultural field.

In other words, the health-related information about the pollinators is, for example, compared with comparative health-related data of pollinators present in the computing unit, and this is used to deduce the state of health of the pollinators in the vicinity of an agricultural field and/or on an agricultural field. If the state of health is good, a plant protection product can be applied to the field, taking into account any risk mitigation measures that may be in place. If the state of health is not optimal, then the output unit may indicate, for example, that no plant protection product can be applied to the field.

In some embodiments, the system is based on bees, particularly honeybees (*Apis mellifera*), as pollinators.

For cultivated plants dependent on biotic pollination, such as pome fruit (e.g., apples and pears) and stone fruit, the honeybee serves as the most important pollinator; however, solitary bees, bumblebees and other insects also contribute to pollination.

In some embodiments, the at least one pollinator sensor of the system is installed on a bee nesting site and/or is present in a bee nesting site. The bee nesting site is located in the vicinity of an agricultural field and/or on an agricultural field.

In other words, the at least one pollinator sensor is installed in the vicinity of the beehive so that highly extensive health-related data can be collected, ideally for all developmental stages of the bee. This can be used to obtain a highly accurate picture of the state of health of the bees. Ideally, multiple pollinator sensors are installed per bee nesting site, and what are collected are health-related data of as many bee nesting sites as possible that are present in the vicinity of the agricultural field or on the agricultural field.

In some embodiments, the health-related data ascertained by the at least one pollinator sensor are selected from the group of: brood temperature, air humidity in the bee nesting site, weight of the bees in the bee nesting site, image analysis of the brood, image analysis of the flight behavior of the bees, bee traffic at the entrance/exit of the bee nesting site, acoustic signals of bees, electromagnetic signals, and gases in the bee nesting site.

In other words, the health-related data are gathered directly in or at the bee nesting site and thereby provide information directly from the bee colony, which can consist of 40 000 to 60 000 individual bees. The number of bees means that the health-related data are highly informative.

In some embodiments, the at least one pollinator sensor is a camera. The camera is configured to create at least one image of the brood within a bee nesting site and/or of the entrance/exit of the bee nesting site.

As a result of image capture in or at the bee nesting site, a multiplicity of information such as, for example, flight behavior or information relating to pests, etc., can be gathered, which in turn provides information about the state of health of the bee colony in the bee nesting site.

In some embodiments, the at least one image is made available to the computing unit via the receiving unit, and the computing unit is configured to carry out an image analysis of the at least one image.

The image analysis on the computing unit makes it possible to automatically analyze image information relating to the bees and their immediate nesting environment in order to draw conclusions about the state of health of the bees. In particular, image capture and image analysis have been carried out continuously over relatively long periods. For example, comparing images of the nesting environment over a relatively long period makes it possible to gain precise knowledge of the state of health of the brood.

In some embodiments, the image analysis by the computing unit comprises using at least one machine learning algorithm.

Such algorithms support a fully automated evaluation of the data, which allows accelerated decision making.

In some embodiments, the system further comprises at least one environmental sensor configured to collect environmental data in the vicinity of and/or on an agricultural field. The at least one environmental sensor is configured to make the environmental data available to the computing unit via the receiving unit, and the computing unit is configured to compare the environmental data together with the health-related data of the pollinators with reference data and thereby ascertain whether or not a plant protection product can be applied to the agricultural field.

Further environmental data not collected by pollinator sensors may have an influence on pollinator health. For example, the local weather around a bee nesting site affects bee foraging. By means of an environmental sensor in the vicinity of the bee nesting site, the local weather can be recorded and taken into account for decision making.

In some embodiments, the environmental data ascertained by the at least one environmental sensor are selected from the group of: weather data and weather forecast data in the vicinity of the agricultural field and/or of the agricultural field, information relating to the growth stage and flowering phase of the plant population present in the vicinity of the agricultural field and/or on the agricultural field, pest pressure and/or pest infestation of the useful plants cultivated on the agricultural field, disease pressure and/or disease infestation of the useful plants cultivated on the agricultural field, weed pressure and/or infestation on the agricultural field.

In some embodiments, the system also comprises a plant protection product control unit. In this case, the output unit is configured in such a way that the plant protection product control unit is activated when the computing unit has ascertained that a plant protection product can be applied to the agricultural field.

In other words, after the decision has been made as to whether a plant protection product can be applied, the system can, for example, fully automatically instruct appropriate plant protection product sprayers to spray the agricultural field with the appropriate plant protection products. As a result, interaction with a farmer is potentially no longer necessary.

In some embodiments, the present disclosure provides a method for plant protection product management on an agricultural field comprising:
(a) collecting health-related data of pollinators in the vicinity of an agricultural field and/or on an agricultural field by means of at least one pollinator sensor;
(b) forwarding the collected health-related data to the computing unit via the receiving unit;
(c) comparing the health-related data of the pollinators with reference data by means of the computing unit and thereby ascertaining whether or not a plant protection product can be applied to the agricultural field; and
(d) displaying and/or outputting an item of information by the output unit relating to the information ascertained by the computing unit as to whether or not a plant protection product can be applied to the agricultural field and/or storing said item of information in a data storage medium.

Some embodiments relate to a computer program product for control of a system according to the first embodiment, which, upon execution by a processor, is configured in such a way to carry out the method according to the second embodiment.

Some embodiments relate to a storage medium which has stored the computer program product.

BRIEF DESCRIPTION OF THE FIGURES

Embodiments of the invention will be described below by reference to the following figures:

FIG. 2 schematically shows a method for plant protection product management on an agricultural field.

DETAILED DESCRIPTION

Figure 1:
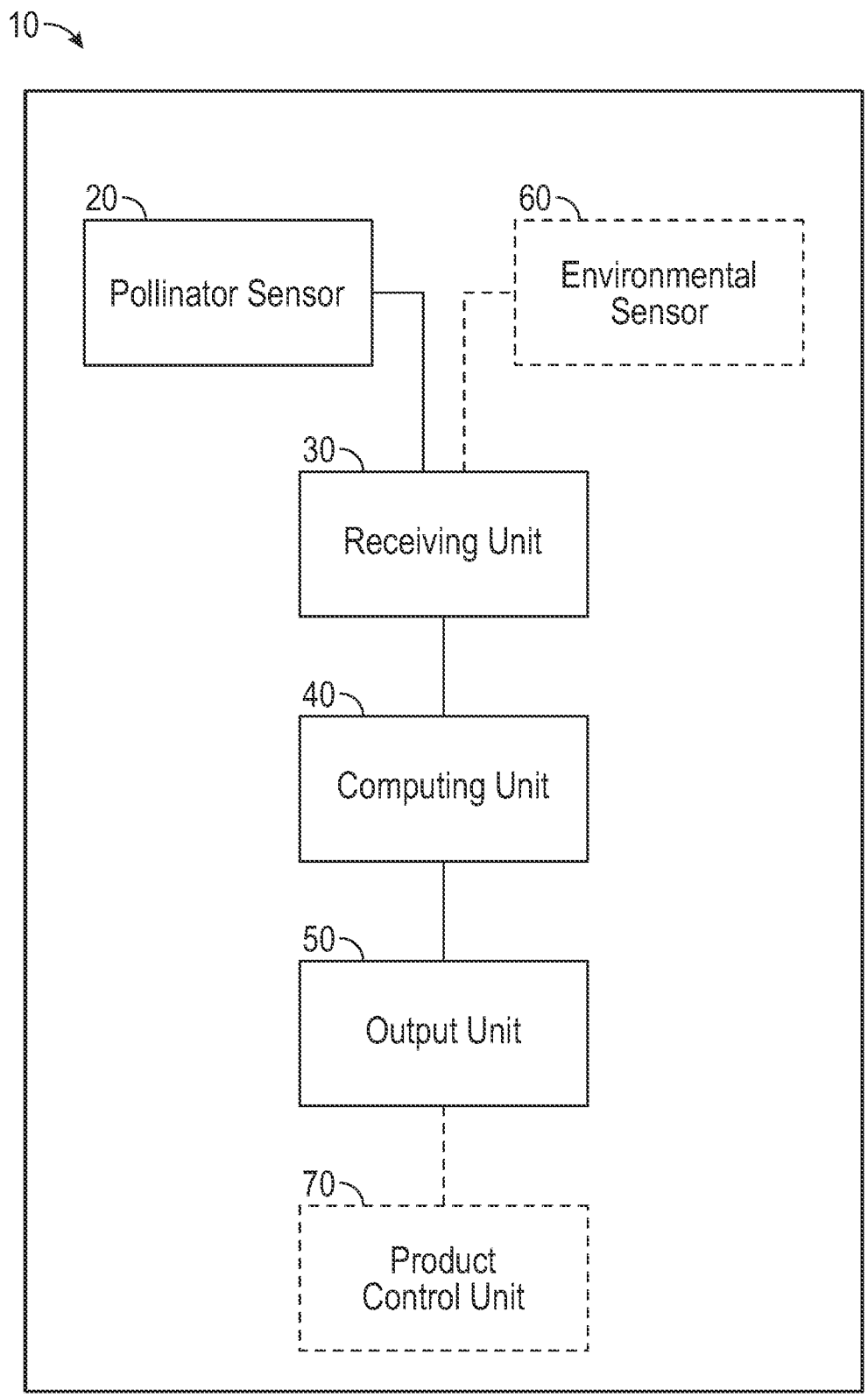
FIG. 1 schematically shows a system for plant protection product management on an agricultural field.

FIG. 1 schematically shows a system 10 for plant protection product management on an agricultural field. The system 10 may comprise at least one pollinator sensor 20 configured to collect health-related data of pollinators in the vicinity of and/or on an agricultural field; a receiving unit 30; a computing unit 40; and an output unit 50. The at least one pollinator sensor may be configured to make the health-related data of the pollinators available to the computing unit via the receiving unit. The computing unit in turn may be configured to compare the health-related data of the pollinators with reference data and thereby ascertain whether or not a plant protection product can be applied to the agricultural field (with respect to pollinator health). The output unit may be configured to display, output or store in a data storage medium at least the information from the computing unit relating to the ascertainment of whether or not a plant protection product can be applied to the agricultural field.

In some embodiments, the at least one pollinator sensor may be selected from the group composed of: camera, thermal camera, temperature sensor, infrared sensor, for example an IR camera, air humidity sensor, weight sensor, odor sensor, gas sensor, LIDAR sensor, microphone, motion detector, counting detector and/or the like. The information from the pollinator sensor can be transmitted to the receiving unit and the computing unit via various transmission technologies known per se to a person skilled in the art, such as, for example, via cable or by wireless means, for example via networks such as PAN (e.g., Bluetooth), LAN (e.g., Ethernet), WAN (e.g., ISDN), GAN (e.g., the Internet), LPWAN or LPN (such as, for example, SigFox, LoRAWAN, etc.), cellular networks or others.

In some embodiments, the sensor comprises a transmission unit for wireless transmission of information.

In some embodiments, the system may further comprise a receiving unit, a computing unit and an output unit. It is conceivable that said units are components of a single computer system, but it is also conceivable that said units are components of a plurality of separate computer systems that are connected to one another via a network in order to transmit data and/or control signals from one unit to another unit. It is, for example, possible for the computing unit to be in the "cloud" and for the analysis steps described in this application to be carried out by said computing unit in the "cloud". A "computer system" is an electronic data processing system that processes data by way of programmable computing rules. Such a system usually comprises a "computer", the unit that comprises a processor for performing logic operations, and also peripherals. In computer technology, "peripherals" refers to all devices that are connected to the computer and are used for control of the computer and/or as input and output devices. Examples thereof are monitor (screen), printer, scanner, mouse, keyboard, drives, camera, microphone, speakers, etc. Internal ports and expansion cards are also regarded as peripherals in computer technology. Modern computer systems are frequently divided into desktop PCs, portable PCs, laptops, notebooks, netbooks and tablet PCs, and what are called handhelds (for example smartphones); all of these systems may be used to implement the invention.

In some embodiments, the receiving unit may be configured to receive the information from the at least one pollinator sensor (or the at least one environmental sensor) and to forward said information to the computing unit. The receiving unit can comprise further electronic elements such as, for example, an input unit such as, for example, an input keyboard, mouse, microphone and/or the like, via which, for example, an inquiry as to whether or not a plant protection product can be applied to the agricultural field can be initiated. Queries can be made at regular intervals (e.g., days or every week), for example once a farmer has recognized that it is necessary to apply a plant protection product to the agricultural field.

In some embodiments, the computing unit may serve to control the receiving unit, to coordinate the data and signal flows between various units, to compare the data with reference data and to perform decision making as to whether or not plant protection products can be applied to the agricultural field. It is conceivable that there are multiple computing units which exchange appropriately necessary data with one another.

According to some embodiments, the computing unit of the system may be configured in such a way that the collected health-related data of the pollinators and reference data can be used as a basis to establish the state of health of the pollinators and thereby ascertain whether or not a plant protection product can be applied to the agricultural field. This means that, for example, data relating to the temperature in the bee nesting site, the relative air humidity in the bee nesting site and the weight of the beehive in the bee nesting site are collected by pollinator sensors and the computing unit compares said data with reference data. If the data gathered are within a range that is normal for healthy bees (i.e., for example is between 32 and 36 degrees Celsius with regard to the brood temperature in the bee nesting site, and the relative air humidity has a value between 45% and 65% and the weight of the beehive in the bee nesting site has continuously increased during the growing season), then a plant protection product can be applied—with regard to maintaining optimal pollinator health or bee health—to an agricultural field. If certain parameters are not within a range that is normal for healthy bees, the recommendation would be not to apply a plant protection product in order not to have a further potential impact on the health of the bees and to investigate why certain parameters are deviating from the normal value for the bees. Other health-related information which can be collected by pollinator sensors, but are not discussed in this section, are additionally or alternatively useful—as discussed below—for assessment or more precise assessment of pollinator health.

In some embodiments, the output unit may be a digitally based transmission, notification and warning system suitable for presenting at least the decision as to whether or not plant protection products can be applied to the agricultural field by means of sound, light, vibrations, electrical signals, electromagnetic pulses, numerical outputs and the like, for example on a monitor, or transmitting said decision to further devices, for example further outputs, control systems, terminals, plant protection product control unit, mobile devices and the like, or storing the information in a data storage medium.

In some embodiments, reference data on the computing unit may be based on health-related data of pollinators that are known from the literature. For instance, it is known that a brood temperature of 33 to 36 degrees Celsius in the bee nesting site during spring/summer is normal for a healthy bee colony. When bees grow up at temperatures of 32 degrees, many of the adult bees do not return to the bee nesting site (Tautz J. et al., PNAS Jun. 10, 2003 100 (12) 7343-7347). If it becomes, for example, too hot in the boxes in the summer (i.e., above 36 degrees Celsius), the bees are forced to invest a lot of time and energy in cooling (humidification and ventilation), which has an adverse effect on the general state of health, since the activities cost a lot of energy and are very time consuming and there is no time for other important tasks. The relative air humidity in a bee nesting site varies between 45% and 65%. In the event of excessively high humidity, pathogens can grow, which thus has a direct impact on the health of the bees. High humidity additionally harms the bees through the increased reproduction and an increased lifespan of a number of parasites. In the event of lower air humidity, the lifespan of the parasites generally drops and reproductive activities decrease. This means that the probability of contracting parasites is lower in the event of reduced air humidity. With respect to the weight of a bee colony in a bee nesting site, it is known that a healthy bee colony exhibits a constant gain in weight from spring through the summer period. This means that if the weight curve decreases, then this may indicate that the state of health of the bee colony is not optimal.

Plant protection products in the context of the present application are understood to mean fungicides, herbicides and/or insecticides.

According to some embodiments, the pollinators may be insects preferably from the group of hoverflies, solitary bees, bumblebees and honeybees. Further preference may be given to bees and especially honeybees (Apis mellifera) as pollinators. Honeybees live in countries which harbor a maximum of 40 000 to 60 000 bees around the summer solstice. For most of the year, the bee colony only consists of females: the queen, who is the only one who lays eggs (up to 2000 per day), and the sterile workers, who collect pollen and nectar, raise the larvae and defend the beehive. From early summer, a few hundred male bees (drones) are also continuously raised. A beehive refers to an artificial nesting site (housing) provided by a beekeeper, together with the colony of honeybees present therein. The housing on its own is called a "box." In this application, the synonymous term "bee nesting site" is mainly used instead.

According to some embodiments, the at least one pollinator sensor may be installed on a bee nesting site and/or may be present in a bee nesting site. The bee nesting site may be located in the vicinity of an agricultural field and/or on an agricultural field.

A person skilled in the art generally knows how to install pollinator sensors on or in the bee nesting site.

In some embodiments, the at least one pollinator sensor may comprise a positioning system. A known positioning system is a satellite navigation system such as, for example, NAVSTAR GPS, GLONASS, Galileo or Beidou. Since the abbreviation GPS (Global Positioning System) is now colloquially used as the generic term for all satellite navigation systems, the term GPS will be used in what follows as the collective term for all positioning systems. Since the bee nesting sites are often erected to remain stationary over a relatively long period in one place, it is conceivable to already determine the geo-coordinates when the bee nesting sites are erected. For example, a bee nesting site may be erected at a location, followed by determination of the geo-coordinates of the location of the erected bee nesting site using a (separate) GPS sensor. It is also conceivable that the geo-coordinates of a location at which a bee nesting site is to be erected are determined, followed by erection of the bee nesting site at the correspondingly determined position. The position of the bee nesting site may, for example, be/have been recorded in a database and/or on a digital map. A pollinator sensor of a bee nesting site may have a unique identifier (e.g., an identification number). If a pollinator sensor of said bee nesting site transmits information to the computing unit, said pollinator sensor authenticates itself by means of the unique identifier, for example. A database can store at which position which pollinator sensor with which identifier has been erected. As a result, the position of the bee nesting site can also be ascertained by querying the database using the unique identifier.

In some embodiments, multiple different pollinator sensors may be installed for one bee nesting site. There are commercial suppliers of multisensor hardware for bee nesting sites that provide systems comprising various sensors such as, for example: bee counter (incoming and outgoing bees are counted separately), bee classification (drone, worker), temperature, air humidity, weight, etc. Examples of commercial suppliers are Lowland Electronics (ApiSCAN), Arnia, Apis Tech and Emsystech.

In some embodiments, all bee nesting sites located in the vicinity of and/or on the agricultural field are provided with at least one pollinator sensor, and preferably each bee nesting site is provided with multiple pollinator sensors. Here, according to one embodiment of the present invention, the expression "in the vicinity of an agricultural field" means that the pollinators are at a spatial distance from the agricultural field, in which they can reach the agricultural field by their own efforts. The pollinators serve especially the plants cultivated on the agricultural field. In another embodiment, the expression "in the vicinity of an agricultural field" means that the pollinators are at a spatial distance from the agricultural field, in which the application of a plant protection product to the agricultural field may have an effect on the pollinators. Both distances can be ascertained empirically. Preferably, the distance from the field is 2 km, even more preferably 1 km and especially preferably 500 m. In the context of the application, the term "agricultural field" refers to the field on which useful plants are cultivated and for which a decision must be made as to whether or not a plant protection product—in view of maintaining pollinator health—is to be applied.

In some embodiments, multiple bee nesting sites in the vicinity of or on the agricultural field may be monitored using pollinator sensors. If it is established that bee health is normal for the majority of bee colonies, but is not optimal for individual bee colonies, the computing unit can decide that a plant protection product can be partially applied to the agricultural field, while maintaining a safe distance from those bee colonies whose health was assessed as not optimal. The safe distance can be between 1 and 3 km.

In some embodiments, the decision can be not to apply a plant protection product to the agricultural field if the health of the majority of bee colonies in the vicinity of or on the agricultural field is not optimal. This may also be made dependent on further data (such as, for example, weed pressure, pest pressure and disease pressure on the field), which may warrant a partial application of plant protection product to the agricultural field with an appropriate safe distance from those bee colonies whose health was assessed as not optimal.

According to some embodiments, the ascertained health-related data of the at least one pollinator sensor may be selected from the group of: brood temperature, air humidity in the bee nesting site, weight of the bees in the bee nesting site, image analysis of the brood, image analysis of the flight behavior of the bees, bee traffic at the entrance/exit of the bee nesting site, acoustic signals of bees, electromagnetic signals and gases in the bee nesting site.

In some embodiments, the optimal brood temperature may be within a temperature range from 32 to 36 degrees Celsius during spring/summer.

In some embodiments, the optimal relative air humidity in the bee nesting site may be between 45% and 65% during spring/summer.

In some embodiments, the weight of the bees in a healthy bee colony in the bee nesting site may increase continuously in the course of spring up to the summer period.

In some embodiments, only temperature, relative air humidity and weight may be measured in order to assess the state of health of the bees within a bee nesting site.

In some embodiments, the weight of the bees in the bee nesting site may be derived by measuring the weight of the entire bee nesting site.

In some embodiments, image analysis of the brood may comprise classifying the contents of the cells of the honeycombs according to, for example, "empty", "egg", "small larva", "medium larva", "large larva", "covered cell", "hatching larva", "nectar", "pollen", "dead larva". From the respective proportions of the classified cells, conclusions can be drawn about the health of the bee colony. Image analysis can be carried out by using, for example, pattern recognition methods or else self-learning systems (e.g., artificial neural networks).

Some embodiments may comprise image analysis of the flight behavior of the bees, especially at the entrance/exit of the bee nesting site. This means, for example, counting how many bees fly into the box through the entrance and how many bees fly out of the box. For example, an image analysis can be used to detect whether bees are returning with pollen and whether they are exhibiting on the whole calm flight behavior when flying in and flying out. Such image analysis can also allow early detection of parasites such as, for example, the Varroa mite (Chazette, L et al., Basic Algorithms for Bee Hive Monitoring and Laser-based Mite Control, IEEE Symposium Series on Computational Intelligence; Conference Paper, December 2016; DOI: 10.1109/SSCI.2016.7850001). This information can be used to assess the state of health of the bee colony in the particular box. Counting bees at the entrance/exit of the nesting site can also be carried out by means of other technologies such as, for example, IR sensors.

Some embodiments may comprise detecting acoustic signals of bees. For example, it is known that the acoustic signals of the bee colony in a bee nesting site change when the bees have been attacked by parasites or have become sick (Bromenshenk J. Jerry et al., Biosensors 2015, 5, 678-711).

Some embodiments may comprise detecting electromagnetic signals in the bee nesting site. It is known that electromagnetic fields, which are generated by cellular communications for example, can affect the health of bees.

Some embodiments may comprise detecting gases in the bee nesting site such as, for example, $CO_2$, $O_2$, $NO_2$, ethanol, $NH_3$, CO, methane, etc. It is known that, for example, the $CO_2$ and $O_2$ content of the bee colony in a box may contain information about the state of health. For example, fluctuations in the proportion of $CO_2$ or a relatively low proportion of $CO_2$ may indicate a loss of bees (due to diseases, parasites, etc.) (Edwards-Murphy F. et al, Computers and Electronics in Agriculture 124, 2016, 211-219).

According to some embodiments, the at least one pollinator sensor may be a camera configured to create at least one image of the brood within a bee nesting site and/or one image of the entrance/exit of the bee nesting site.

According to some embodiments, the at least one image may be made available to the computing unit via the receiving unit, and the computing unit may be configured to carry out an image analysis of the at least one image.

According to some embodiments, the image analysis may comprise using at least one machine learning algorithm. It is conceivable that, as described above in connection with the image analysis of the brood, use is made of, for example, pattern recognition methods or else self-learning systems (e.g., artificial neural networks) (see, for example, Astha Tiwari, A deep learning approach to recognizing bees in video analysis of bee traffic, 2018, All Graduate theses and Dissertations; 7076, "https://digitalcommons.usu.edu/etd/7076".

According to some embodiments, the system may further comprise at least one environmental sensor 60 configured to collect environmental data in the vicinity of and/or on an agricultural field, wherein the at least one environmental sensor is configured to make the environmental data available to the computing unit via the receiving unit, wherein the computing unit is configured to compare the environmental data together with the health-related data of the pollinators with reference data and thereby ascertain whether or not a plant protection product can be applied to the agricultural field.

In some embodiments, the environmental sensor can, for example, be a weather station which, for example, is installed outside a bee nesting site in which at least one pollinator sensor is also mounted. It has become apparent that the local weather around a bee nesting site affects individual parameters such as, for example, the relative air humidity in the box or the flight behavior of the bees, etc.

In some embodiments, the at least one environmental sensor may be an interface to further databases containing local information relating to the agricultural field and/or to the environment thereof. Such databases can contain weather data, satellite data, ground data, etc. It is also possible that the database contains entries gathered by a farmer in the course of the growing season through scouting in the vicinity of or on the agricultural field (scouting database).

In some embodiments, the at least one environmental sensor may be a sensor installed on the agricultural field in close proximity to the useful plants. Said sensor can be at least one camera which collects various data relating to the plant population present in the vicinity of and/or on the agricultural field and forwards said data to the receiving unit by means of transmission technologies known per se to a person skilled in the art, for example by means of radio.

According to some embodiments, the environmental data ascertained by the at least one environmental sensor may be selected from the group of: weather data and weather forecast data in the vicinity of the agricultural field and/or of the agricultural field, information relating to the growth stage and flowering phase of the plant population present in the vicinity of the agricultural field and/or on the agricultural field, pest pressure and/or pest infestation of the useful plants cultivated on the agricultural field, disease pressure and/or disease infestation of the useful plants cultivated on the agricultural field, weed pressure and/or infestation on the agricultural field.

In some embodiments, the at least one environmental sensor may be installed in the vicinity of and/or on the agricultural field and is preferably a camera. Image analysis in the computing unit (e.g., by means of pattern recognition methods or else self-learning systems such as, for example, artificial neural networks) of the data gathered by the camera makes it possible to collect information that may be of relevance to the decision as to whether or not a plant protection product is to be applied to an agricultural field.

According to some embodiments, the system may further comprise a plant protection product control unit 70. The output unit may be configured to activate the plant protection product control unit when the computing unit has ascertained that a plant protection product can be applied to the agricultural field.

In some embodiments, the plant protection product control unit may define a spray unit, optionally as part of a vehicle or mounted on a vehicle, which spray unit is configured to apply at least one plant protection product to the agricultural field. Said unit can take on various configurations and can be, for example, a knapsack sprayer, a field sprayer, a towed field sprayer, a self-propelled field sprayer, a spray robot, a spray drone or a spray plane, etc.

FIG. 2 shows a method 100 for plant protection product management on an agricultural field. In some embodiments, method comprises:

in step (a), collecting 110 health-related data of pollinators in the vicinity of an agricultural field and/or on an agricultural field by means of at least one pollinator sensor;

in step (b), forwarding 120 the collected health-related data to the computing unit via the receiving unit;

in step (c), comparing 130 the health-related data of the pollinators with reference data by means of the computing unit and thereby ascertaining whether or not a plant protection product can be applied to the agricultural field; and in step (d), displaying and/or outputting 140 an item of information by the output unit relating to the information ascertained by the computing unit as to whether or not a plant protection product can be applied to the agricultural field and/or storing said item of information in a data storage medium.

In some embodiments in step (c), health-related data of the pollinators may be compared with reference data in order to establish the state of health of the pollinators and thereby ascertain whether or not a plant protection product can be applied to the agricultural field.

In some embodiments in step (a), health-related data of bees in the vicinity of an agricultural field and/or on an agricultural field may be collected by means of at least one pollinator sensor.

In some embodiments in a step before step (a), at least one pollinator sensor may be installed on a bee nesting site and/or in a bee nesting site, wherein the bee nesting site is located in the vicinity of an agricultural field and/or on an agricultural field.

In some embodiments in step (a), health-related data of bees may be collected by means of at least one pollinator sensor, wherein the data may be selected from the group of: brood temperature, air humidity in the bee nesting site, weight of the bees in the bee nesting site, image analysis of the brood, image analysis of the flight behavior of the bees, bee traffic at the entrance/exit of the bee nesting site, acoustic signals of bees, electromagnetic signals and gases in the bee nesting site.

In some embodiments in step (a), the at least one pollinator sensor may comprise a camera configured to create at least one image of the brood within a bee nesting site and/or one image of the entrance/exit of the bee nesting site.

In some embodiments in steps (a) to (c), health-related data of bees may be collected by means of a camera. The at least one image may be forwarded to the computing unit via the receiving unit, and an image analysis of the at least one image may be carried out by means of the computing unit.

In some embodiments in step (c), an image analysis may be carried out by using at least one machine learning algorithm.

In some embodiments in steps (a) to (c), environmental data in the vicinity of and/or on an agricultural field may be collected by means of at least one environmental sensor. The environmental data may be forwarded to the computing unit via the receiving unit. The environmental data along with health-related data of the pollinators may be compared with reference data in order to ascertain whether or not a plant protection product can be applied to the agricultural field.

In one example in step (a), collected environmental data may be selected from the group of: weather data and weather forecast data in the vicinity of the agricultural field and/or of the agricultural field, information relating to the growth stage and flowering phase of the plant population present in the vicinity of and/or on the agricultural field, pest pressure and/or pest infestation of the useful plants cultivated on the agricultural field, disease pressure and/or disease infestation of the useful plants cultivated on the agricultural field, or weed pressure and/or infestation on the agricultural field.

In some embodiments in step (e), at least one plant protection product may be applied to an agricultural field by activating a plant protection product control unit when the computing unit has ascertained that a plant protection product can be applied to the agricultural field.

Figure 3:
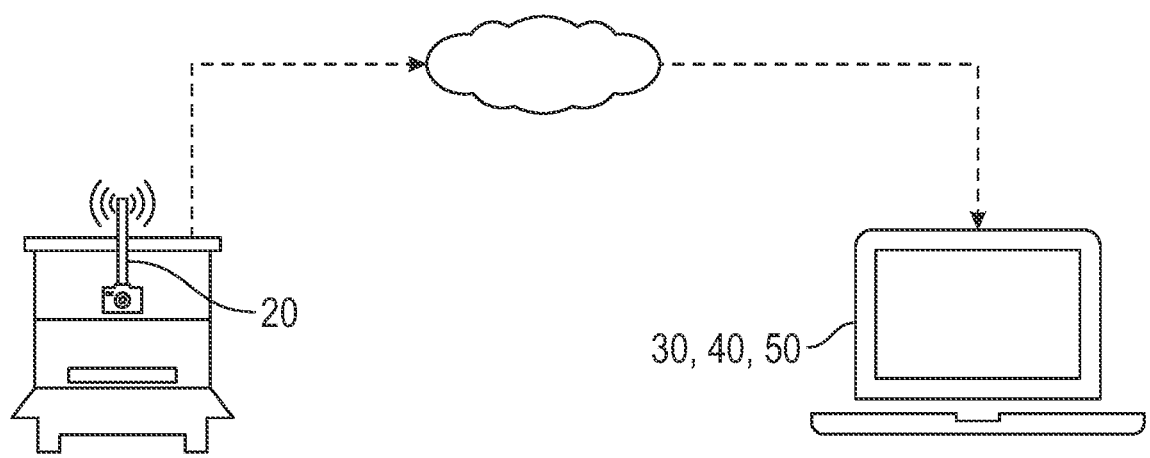
FIG. 3 schematically shows the system for plant protection product management with a bee nesting site.

FIG. 3 schematically shows a system for plant protection product management with a bee nesting site. Depicted on the left-hand side is a bee nesting site which comprises a pollinator sensor 20 (depicted as a camera) and also makes available to a computer (depicted as a laptop; 30, 40, 50) information from the sensor via a radio network via the "cloud" depicted in the middle. The computing unit 40 uses the sensor data to ascertain whether or not a plant protection product can be applied to an agricultural field and displays this information on the monitor (output unit 50). It is via the receiving unit 30 that the inquiry as to whether a plant protection product can now be applied can be initiated.

Figure 4:
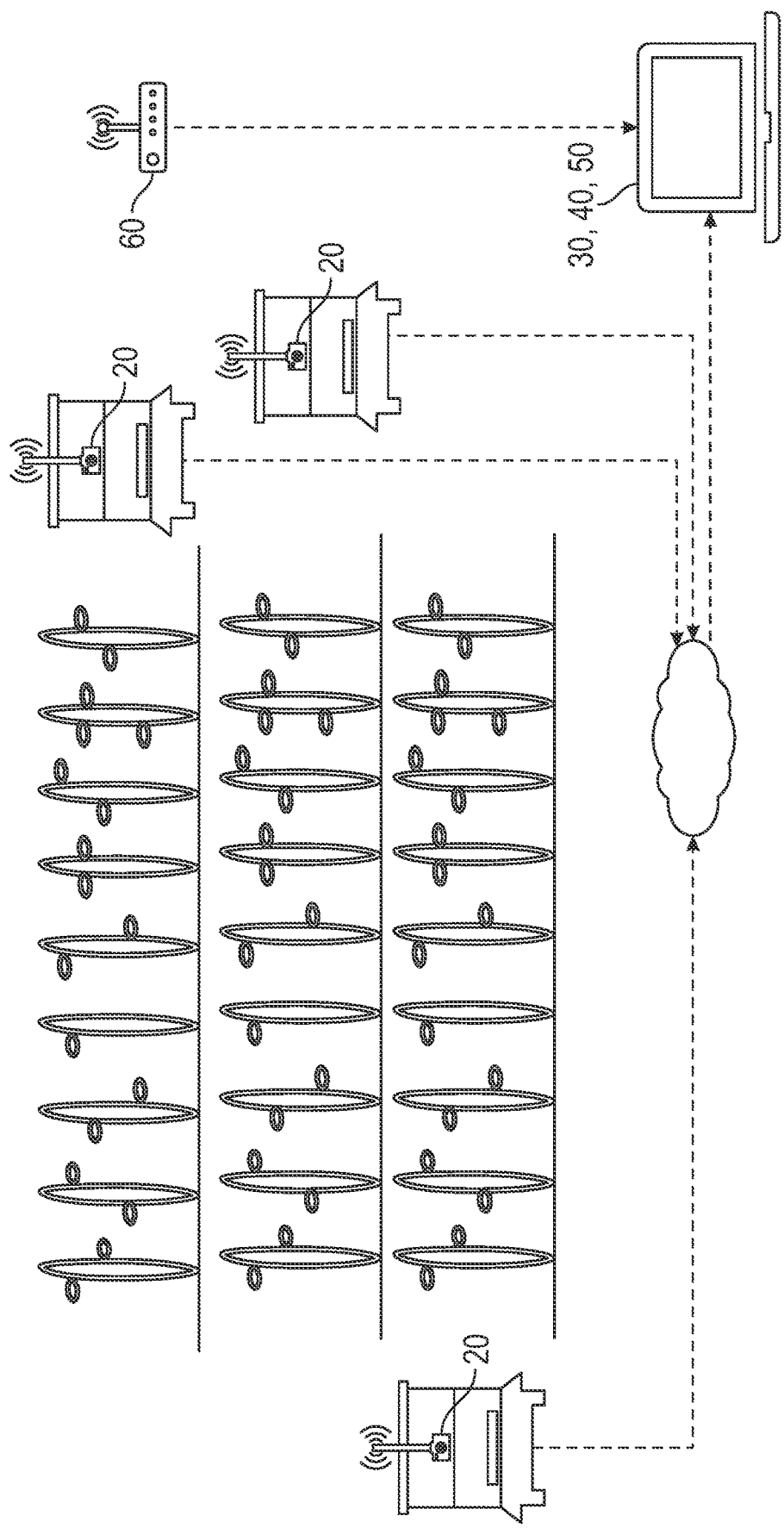
FIG. 4 shows a specific example of the system with an agricultural field surrounded by three bee nesting sites.

FIG. 4 shows a specific example of the system with an agricultural field surrounded by three bee nesting sites. The agricultural field is depicted schematically in the middle (three lines; depicted schematically at right angles on each line are many useful plants of the same kind, such as, for example, corn). The system comprises three bee nesting sites located in close proximity to the agricultural field. The bee nesting sites comprise one or more pollinator sensor(s) 20 and send the health-related data to a computer 30, 40, 50 via the radio network, for example via the "cloud". The system also additionally includes at least one environmental sensor 60 which makes environmental data available to the computer via the radio network. The computing unit 40 uses all sensor data (health-related data and environmental data) compared against reference data to ascertain whether or not a plant protection product can be applied to an agricultural field and displays this information on the monitor (output unit 50). It is via the receiving unit 30 that the inquiry as to whether a plant protection product can now be applied can be initiated.

Figure 5:
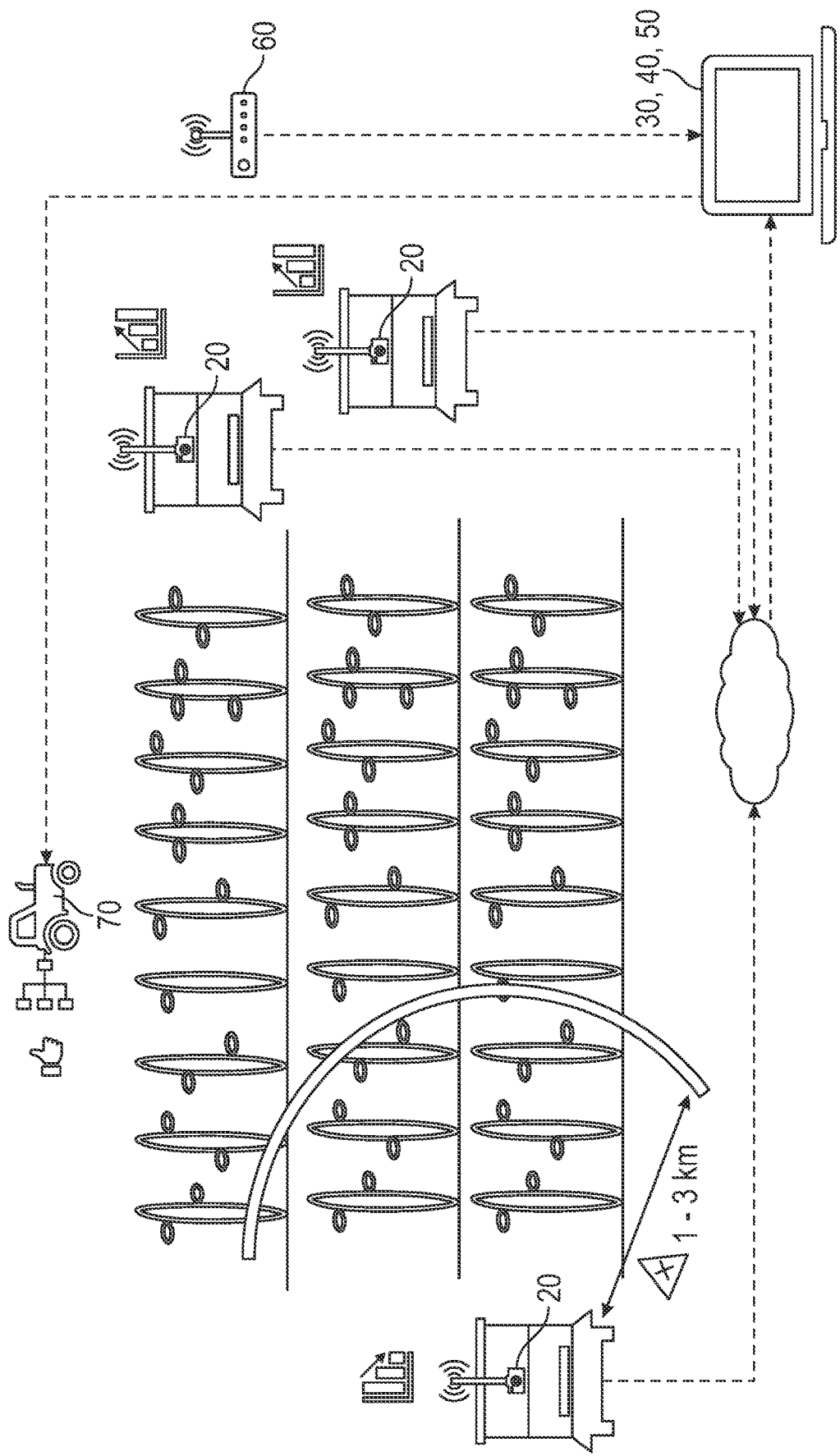
FIG. 5 shows a specific example of decision making by the system with regard to an agricultural field. There are three bee nesting sites in the vicinity of the field.

FIG. 5 shows a specific example of decision making by the system with regard to an agricultural field. The system consists of the same components as already depicted in FIG. 4, but with the addition of a plant protection product control unit 70 which implements the decision made by the computing unit 40 as to whether or not spraying can take place. In this example, the plant protection product control unit 70 is a towed field sprayer which has been mounted on a tractor and is activated via the output unit 50 and the radio network, such as, for example, via the cloud, once the computing unit 40 has come to an appropriate decision of the application of plant protection products being possible. In this example, it was by comparison with reference data that the computing unit 40 established that the health-related data of the bee colonies in the two bee nesting sites on the right are in order and that the health-related data of the bee colony in the bee nesting site on the left are not optimal. The computing unit decides that application of at least one plant protection product via the towed field sprayer while maintaining a safe distance of 1 to 3 km from the bee nesting site on the left is possible and activates the plant protection product control unit accordingly.

Figure 6:
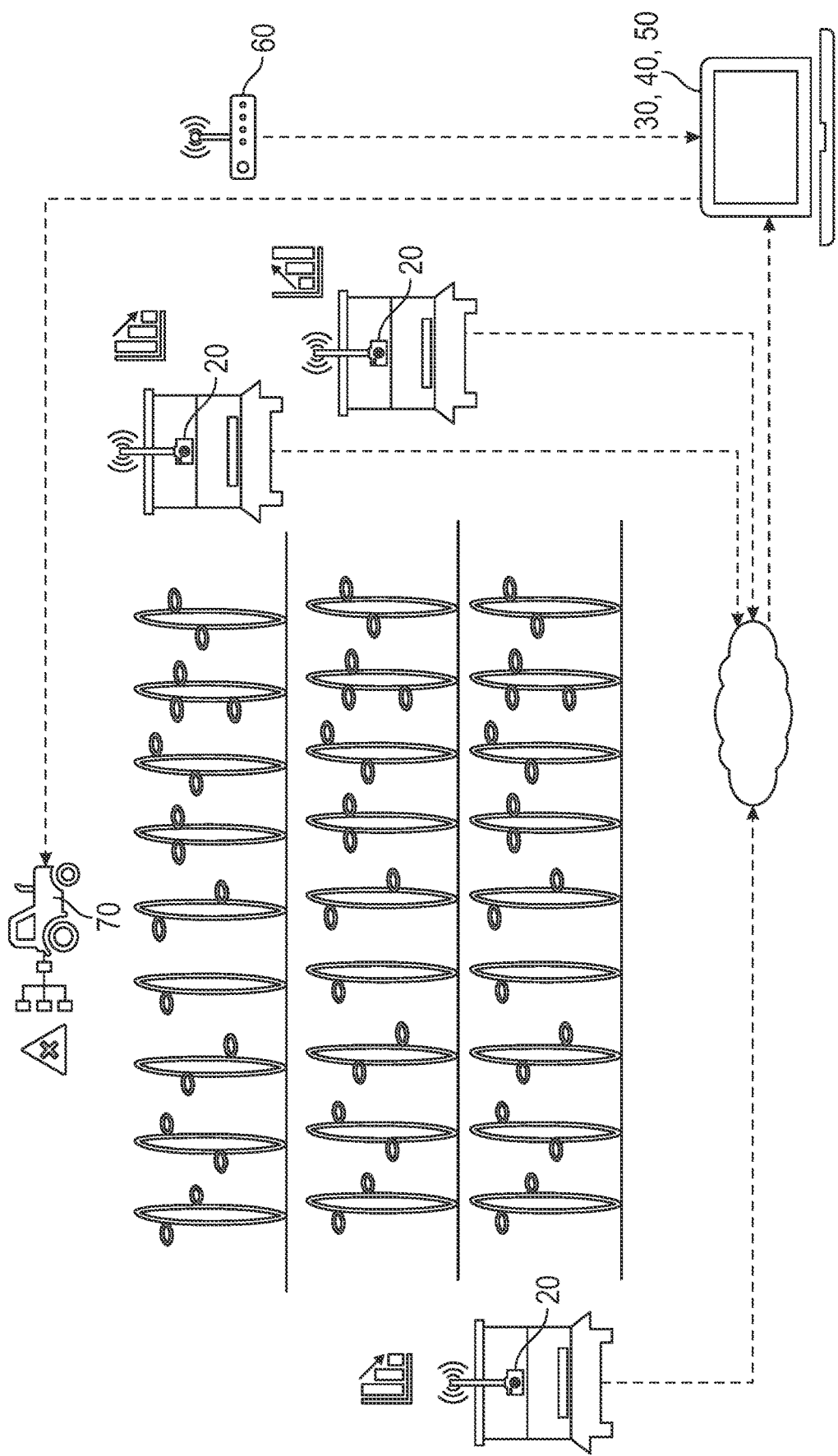
FIG. 6 shows a further specific example of decision making by the system, which has already been described in FIG. 5.

FIG. 6 shows a further specific example of decision making by the system which has already been described in FIG. 5, with the difference that, in this system, the health-related data compared against reference data also indicate a bee colony in poor health with respect to the upper-right bee nesting site. The environmental data from the environmental sensor 60 indicate that the agricultural field does not have a pest infestation and also has only low pest pressure. The computing unit 40 therefore decides that, since the majority of the bee colonies are not in an optimal state of health and there is no pest infestation or there is low pest pressure, no plant protection product is to be applied to the agricultural field.

Figure 7:
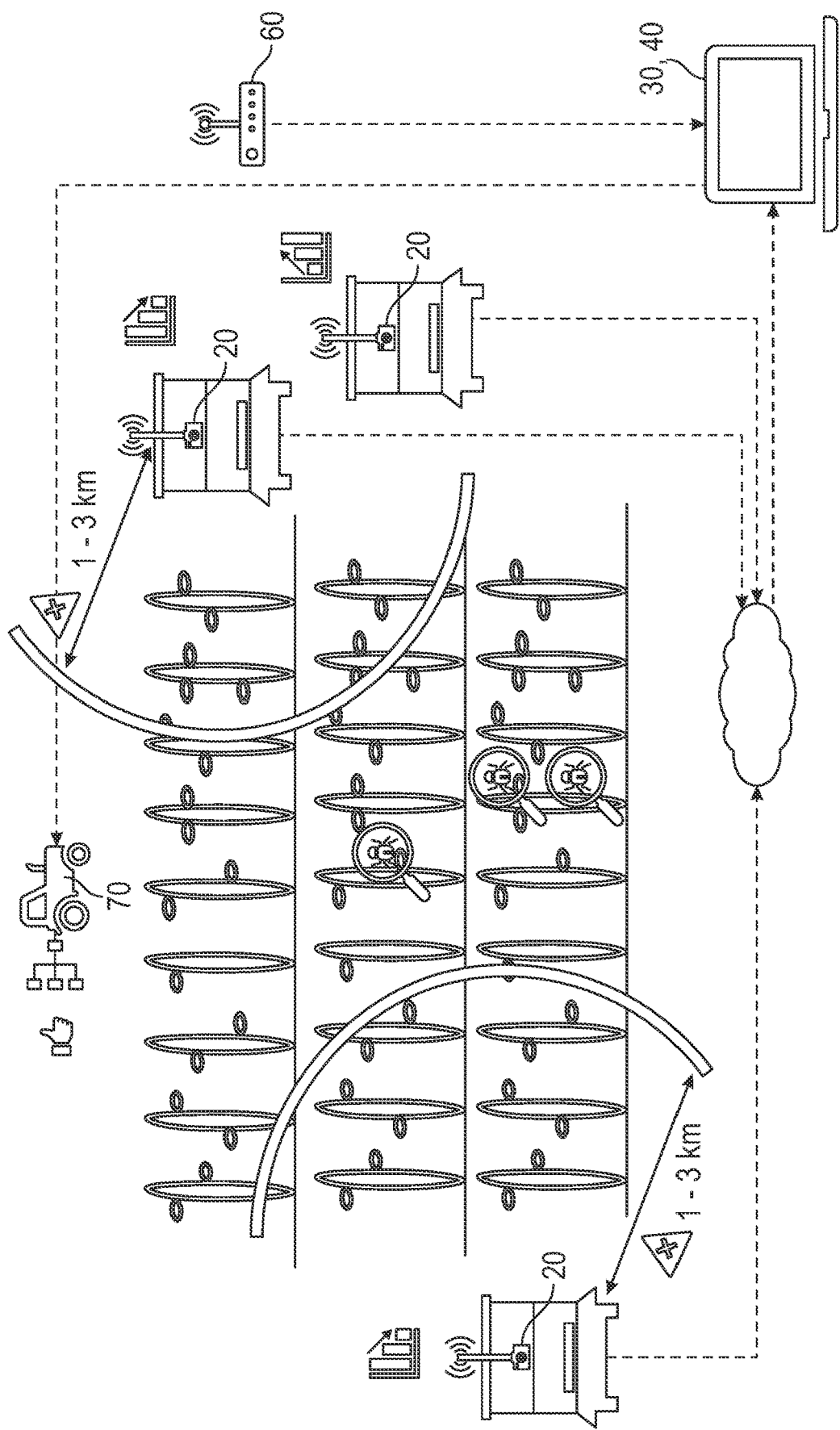
FIG. 7 shows a further specific example of decision making by the same system, as shown in FIGS. 5 and 6.

FIG. 7 shows a further specific example of decision making by the same system as shown in FIG. 6, with the difference that the environmental data from the environmental sensor 60 indicate that the agricultural field has a pest infestation and also has high pest pressure. From this starting position, the computing unit 40 decides that application of at least one plant protection product via the towed field sprayer while maintaining a safe distance of 1 to 3 km from the bee nesting site on the left and from the upper-right bee nesting site is possible and activates the plant protection product control unit accordingly.

Further embodiments of the invention relate to a computer program product for control of the above-described system, which, upon execution by a processor, is configured in such a way to carry out the above-described method. A further embodiment relates to a storage medium which has stored the computer program product.

The invention has been explained without making a significant distinction between the subjects of the invention (system, method, computer program product, storage medium). On the contrary, the explanations are intended to apply analogously to all the subjects of the invention, irrespective of the context in which they are given.

Where steps are stated in an order in the present description or in the claims, this does not necessarily mean that the invention is limited to the order stated. Instead, it is conceivable that the steps are also executed in a different order or else in parallel to one another, unless one step builds on another step, which absolutely requires that the step building on the previous step be executed subsequently (which will however become clear in the individual case). The orders stated are thus preferred embodiments of the invention.

The invention claimed is:

1. A system for plant protection product management on an agricultural field, comprising:
at least one pollinator sensor configured to collect health-related data of pollinators in a vicinity of the agricultural field and/or on the agricultural field, wherein the health-related data of pollinators comprises data gathered directly in or at a pollinator nesting site;
a positioning system configured to determine a location of the pollinator nesting site;
a plant protection product controller configured to apply a plant protection product in the vicinity of the location of the pollinator nesting site; and
one or more processors,
wherein the at least one pollinator sensor is configured to make the health-related data and the location of the pollinators available to the one or more processors, wherein the one or more processors are configured to:
compare the health-related data of the pollinators with reference data and thereby ascertain whether or not the plant protection product can be applied in the vicinity of the location of the pollinator nesting site,
display, output, or store in a data storage medium at least information relating to the ascertainment of whether or not the plant protection product can be applied in the vicinity of the location of the pollinator nesting site, and activate the plant protection product controller to apply the plant protection product in the vicinity of the location of the pollinator nesting site when the one or more processors have ascertained that a plant protection product can be applied in the vicinity of the location of the pollinator nesting site.

2. The system of claim 1, wherein the one or more processors are configured to use the collected health-related data of the pollinators and reference data to establish the state of health of the pollinators and thereby ascertain whether or not a plant protection product can be applied in the vicinity of the location of the pollinator nesting site.

3. The system of claim 1, wherein the pollinators are bees.

4. The system of claim 3, wherein the at least one pollinator sensor is installed on a bee nesting site and/or is present in a bee nesting site, and the bee nesting site is located in the vicinity of the agricultural field and/or on the agricultural field.

5. The system of claim 3, wherein the health-related data ascertained by the at least one pollinator sensor are selected from the group of: temperature of a brood within the bee nesting site, air humidity in the bee nesting site, weight of the bees in the bee nesting site, image analysis of the brood within the bee nesting site, image analysis of the flight behavior of the bees, bee traffic at an entrance/exit of the bee nesting site, acoustic signals of bees, electromagnetic signals and gases in the bee nesting site.

6. The system of claim 5, wherein the at least one pollinator sensor is a camera configured to create at least one image of the brood within the bee nesting site and/or one image of the entrance/exit of the bee nesting site.

7. The system of claim 6, wherein at least one image of the brood and/or one image of the entrance/exit of the bee nesting site is made available to the one or more processors, and the one or more processors are configured to carry out an image analysis of the at least one image.

8. The system of claim 7, wherein the image analysis comprises using at least one machine learning algorithm.

9. The system of claim 1, wherein the system further comprises at least:
one environmental sensor configured to collect environmental data in the vicinity of and/or on an agricultural field,
wherein the at least one environmental sensor is configured to make the environmental data available to the one or more processors,
wherein the one or more processors are configured to compare the environmental data and the health-related data of the pollinators with reference data and thereby ascertain whether or not a plant protection product can be applied in the vicinity of the of the location of the pollinator nesting site.

10. The system of claim 9, wherein the environmental data ascertained by the at least one environmental sensor are selected from the group of: weather data and weather forecast data in the vicinity of the agricultural field and/or of the agricultural field, information relating to a growth stage and a flowering phase of a plant population present in the vicinity of and/or on the agricultural field, pest pressure and/or pest infestation of useful plants cultivated on the agricultural field, disease pressure and/or disease infestation of the useful plants cultivated on the agricultural field, weed pressure and/or infestation on the agricultural field.

11. The system of claim 1, wherein the at least one pollinator sensor comprises the positioning system.

12. The system of claim 1, wherein the at least one pollinator sensor is separate from the positioning system.

13. The system of claim 1, wherein the one or more processors are configured to:
compare the health-related data of the pollinators with the reference data and thereby ascertain whether or not the plant protection product can be applied in an area of the agricultural field outside of the vicinity of the location of the pollinator nesting site, and
activate the plant protection product controller to apply the plant protection product in the area of the agricultural field when the one or more processors have ascertained that the plant protection product can be applied in the area of the agricultural field outside of the vicinity of the location of the pollinator nesting site.

14. A method for plant protection product management on an agricultural field, comprising:
collecting health-related data of pollinators in a vicinity of the agricultural field and/or on the agricultural field using at least one pollinator sensor, wherein the health-related data of pollinators comprises data gathered directly in or at a pollinator nesting site;
determining a location of the pollinator nesting site using a positioning system;
forwarding the collected health-related data and the location of the pollinator nesting site to one or more processors;
comparing the health-related data of the pollinators with reference data using the one or more processors and thereby ascertaining whether or not a plant protection product can be applied in the vicinity of the location of the pollinator nesting site;
displaying and/or outputting by the one or more processors an item of information relating to information ascertained by one or more processors as to whether or not the plant protection product can be applied to the agricultural field and/or storing said item of information in a data storage medium; and
activating a plant protection product controller to apply the plant protection product in the vicinity of the location of the pollinator nesting site when the one or more processors have ascertained that the plant protection product can be applied in the vicinity of the location of the pollinator nesting site.

15. A non-transitory computer readable storage medium comprising instructions for control of a system comprising at least one pollinator sensor and one or more processors, wherein execution of the instructions by the system cause the system to:
collect health-related data of pollinators in a vicinity of an agricultural field and/or on the agricultural field using at least one pollinator sensor, wherein the health-related data of pollinators comprises data gathered directly in or at a pollinator nesting site;
determine a location of the pollinator nesting site using a positioning system;
forward the collected health-related data from the at least one pollinator sensor and the location of the pollinator nesting site from the positioning system to the one or more processors;
compare the health-related data of the pollinators with reference data using the one or more processors and thereby ascertaining whether or not a plant protection product can be applied in the vicinity of the location of the pollinator nesting site;
display and/or output by the one or more processors an item of information relating to information ascertained by one or more processors as to whether or not the plant protection product can be applied to the agricultural field and/or storing said item of information in a data storage medium; and activating a plant protection product controller to apply the plant protection product in the vicinity of the location of the pollinator nesting site when the one or more processors have ascertained that the plant protection product can be applied in the vicinity of the location of the pollinator nesting site.

* * * * *